US007610169B2

(12) United States Patent
Washizawa

(10) Patent No.: US 7,610,169 B2
(45) Date of Patent: Oct. 27, 2009

(54) REGRESSION ANALYSIS APPARATUS AND METHOD

(75) Inventor: Teruyoshi Washizawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 11/757,545

(22) Filed: Jun. 4, 2007

(65) Prior Publication Data

US 2007/0288199 A1     Dec. 13, 2007

(30) Foreign Application Priority Data

Jun. 9, 2006     (JP)     ............... 2006-161636

(51) Int. Cl.
G06F 17/18     (2006.01)
(52) U.S. Cl. .................................... 702/179
(58) Field of Classification Search ................ 702/179, 702/180, 181, 189; 703/2; 708/446, 490
See application file for complete search history.

(56) References Cited

U.S. PATENT DOCUMENTS

| 5,641,962 | A * | 6/1997 | Perry et al. ............ 250/339.09 |
| 2005/0004683 | A1 * | 1/2005 | Yamazaki ..................... 700/30 |
| 2005/0125090 | A1 * | 6/2005 | Sakano et al. ............... 700/108 |
| 2005/0146709 | A1 * | 7/2005 | Oh et al. ........................ 356/72 |

FOREIGN PATENT DOCUMENTS

| JP | 06-110504 | 4/1994 |
| JP | 06-117932 | 4/1994 |
| JP | 06-301669 | 10/1994 |
| JP | 06-350843 | 12/1994 |
| JP | 07-017346 | 1/1995 |

OTHER PUBLICATIONS

Amari and Kawanabe, "Estimation of Linear Relations: Is the Least Square Method the Best?", Jun. 1996, Industrial and Applied Mathematics, vol. 6, No. 2, pp. 96-109. (English Abstract at p. 15)(English translation of Section 2).

W. Wu and R. Manne, "Fast Regression Method in a Lanczos (or PLS-1) Basis. Theory and Applications", Jul. 24, 2000, Chemometrics and Intelligent Laboratory Systems, vol. 51, No. 2, pp. 145-161.

R. Ergon, "Informative PLS Score-Loading Plots for Process Understanding and Monitoring", 2004, Journal of Proces Control 14, pp. 889-897.

G. Heinz, L. Peterson, R. Johnson, and C. Kerk, "Exploring Relationships in Body Dimensions", 2003, Journal of Statistics Education, vol. 11, No. 2.

S.K. Kachigan, "Multivariate Statistical Analysis", 1991, pp. 164-169.

* cited by examiner

*Primary Examiner*—Michael P Nghiem
(74) *Attorney, Agent, or Firm*—Canon U.S.A., Inc., IP Division

(57) ABSTRACT

A variance-covariance matrix of a matrix having a combination of multivariate data and objective variables is obtained, and multiple eigenvalues and their corresponding eigenvectors are calculated by eigenvalue decomposition of the variance-covariance matrix. Accumulated contributions are calculated from the multiple eigenvalues in descending order of absolute value of the eigenvalues. Regression coefficients are calculated from eigenvalues and eigenvectors that correspond to accumulated contributions that exceed a predetermined value.

8 Claims, 6 Drawing Sheets

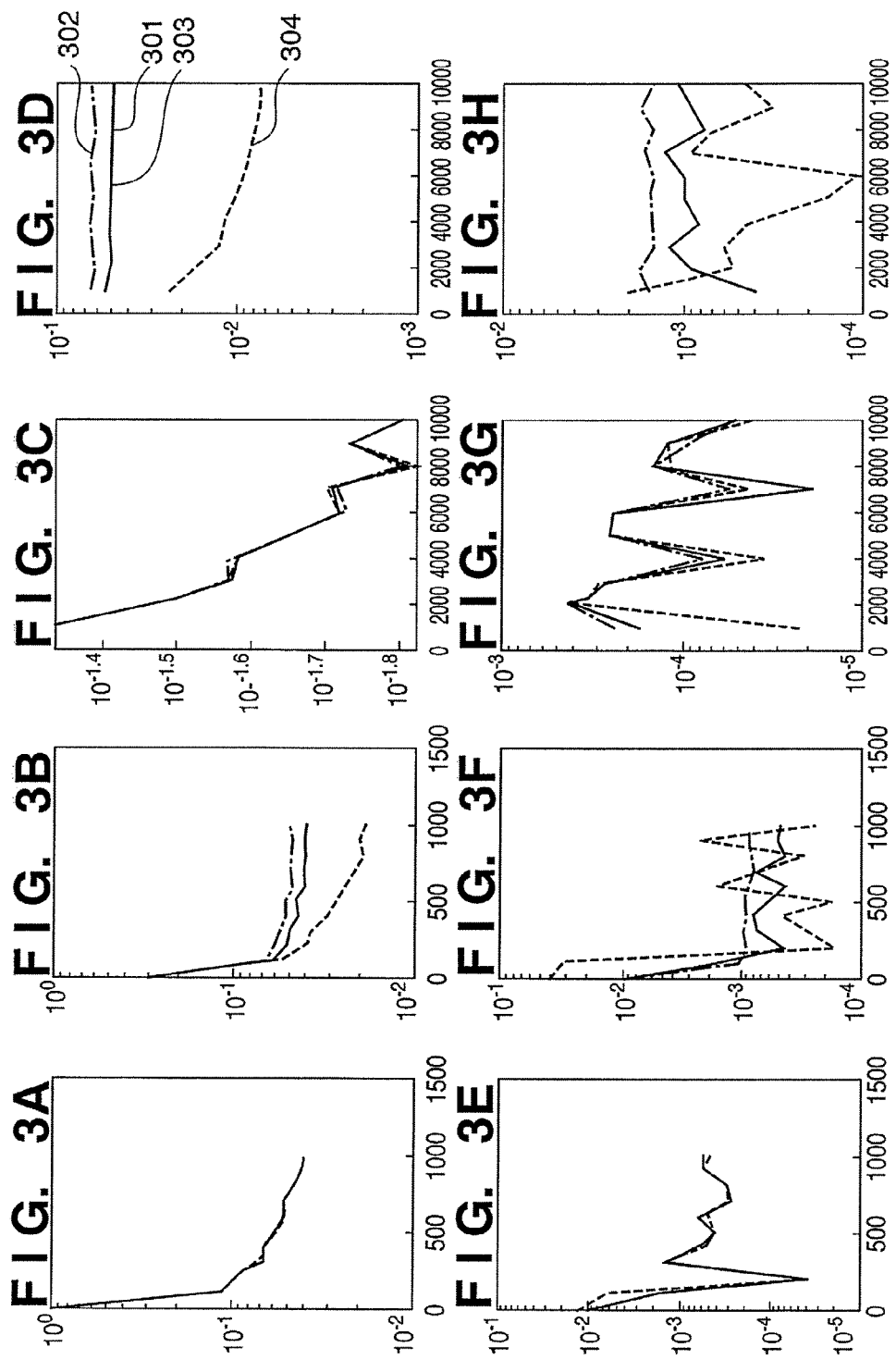

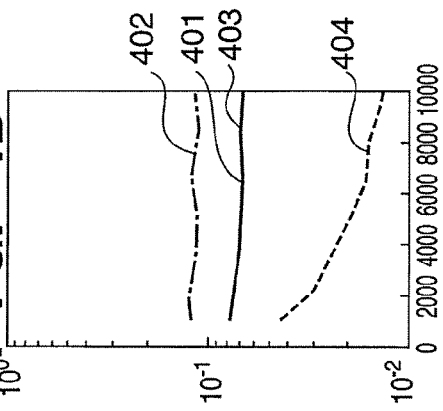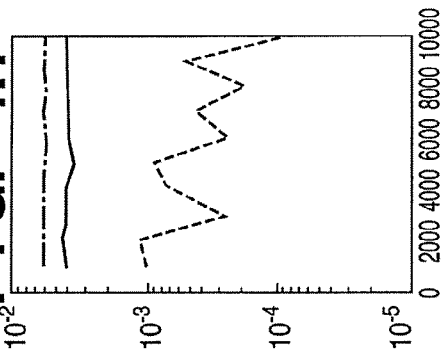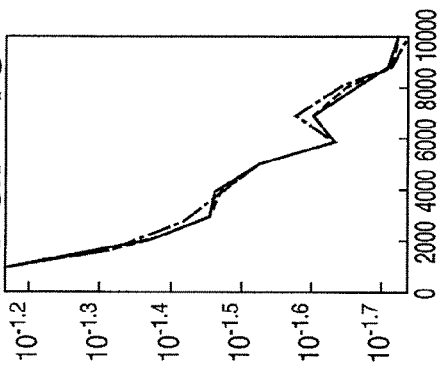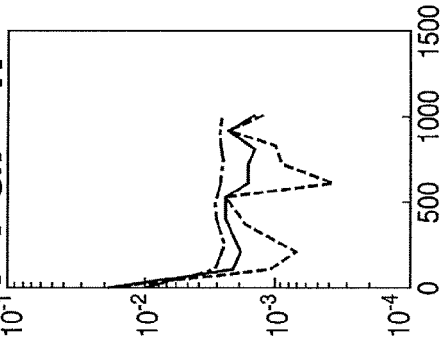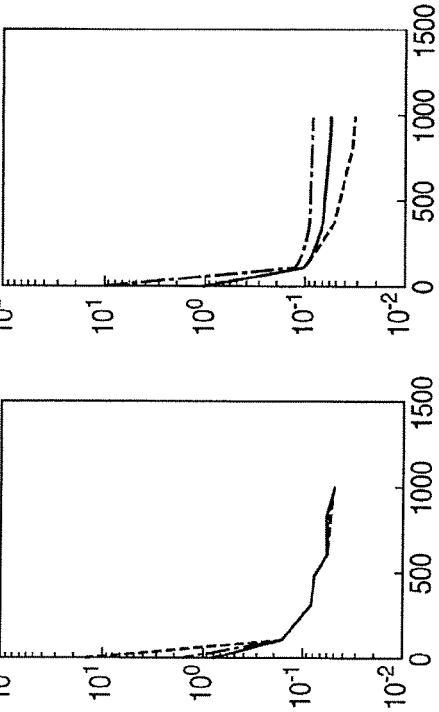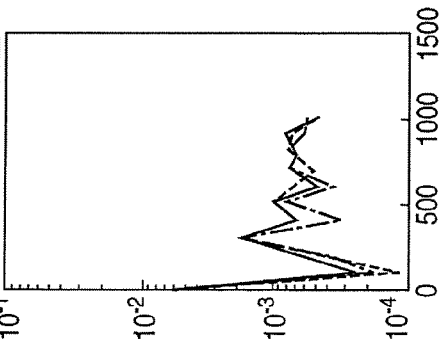

REGRESSION ANALYSIS APPARATUS AND METHOD

BACKGROUND OF THE INVENTION

1. Field of the Invention

The present invention relates to a technique for obtaining objective variables from multivariate data.

<Description of Symbols>

Symbols used in the following description will be defined below.

1. The elements of D-dimensional sample vectors x and y are denoted by x(1), x(2), ..., x(D) and y(1), y(2), ..., y(D), respectively.

2. The sample average values of N sample vectors x and y are denoted by <x> and <y>, respectively.

$$<x> := \left(\frac{1}{N}\right)\left(\sum_{j=1}^{j=N} xj(1), \sum_{j=1}^{j=N} xj(2), \ldots, \sum_{j=1}^{j=N} xj(D)\right)^T \quad (1)$$

3. Variance-Covariance

The standard deviation Sxx of sample vectors xj is represented by an equation (2).

$$Sxx = \left(\frac{1}{N}\right)\sum_{j=1}^{j=N} \|xj - <x>\|^2 \quad (2)$$

The standard deviation Syy of sample vectors yj is represented by an equation (3).

$$Syy = \left(\frac{1}{N}\right)\sum_{j=1}^{j=N} \|yj - <y>\|^2 \quad (3)$$

Here, the covariance of x and y is represented by an equation (4).

$$Sxy = \left(\frac{1}{N}\right)\sum_{j=1}^{j=N} \|xj - <x>\|\|yj - <y>\| \quad (4)$$

2. Description of the Related Art

In a case that N sets of an input vector x in an unknown system and an output vector y, or N measurement values of variables x and y are given and there is a linear relation between x and y, the relation can be written as $$Y = \theta 1^T x + \theta 2 \quad (5)$$

The relation between x and y can be obtained by obtaining parameters θ1 and θ2 in the equation (5). The technique for estimating the values of parameters θ1 and θ2 is known as the regression analysis technique.

As an exemplary application for regression analysis, multiple linear regression analysis for estimating the state of a process is disclosed in Japanese Patent Laid-Open No. 6-110504. Multiple linear regression analysis is also used in Japanese Patent Laid-Open No. 6-117932 for estimating the spectral reflectance of a minute sample from spectral reflectances measured with a calorimeter. In Japanese Patent Laid-Open No. 6-301669, multiple linear regression analysis is used to estimate the snowfall in an area where no snow accumulation measuring device is installed from snow accumulation information obtained from a snowfall accumulation measuring device with a high degree of accuracy. In Japanese Patent Laid-Open No. 6-350843, multiple linear regression analysis is used to estimate a reproduced color density from a primary color density and a reproduced color density measured from samples prepared by combining the three primary colors in various ways. Furthermore, in Japanese Patent Laid-Open No. 7-017346, multiple linear regression analysis is used to estimate a road friction coefficient from the braking pressure, wheel acceleration, and wheel slip ratio of a vehicle in order to calculate the road friction coefficient from the conditions of the vehicle while the vehicle is moving.

There are many other exemplary applications in various fields. What is common to those applications is that multiple linear regression analysis used as means for estimating parameters of a function from an input vector (explanatory variable) to an output value (objective variable) with a high degree of accuracy plays the primary role.

An equation used for the estimation can be represented as follows, for example, as described on page 165 of the article by K. Kachigan entitled "Multivariate Statistical Analysis", Radius (1991). First, the equation (5) is transformed to $$Y = \theta^T X \quad (6)$$

where $$X = \begin{vmatrix} 1 & 1 & \cdots & 1 \\ x1(1) & x2(1) & \cdots & xN(1) \\ x1(2) & x2(2) & \cdots & xN(2) \\ \cdots & \cdots & \cdots & \cdots \\ x1(D) & x2(D) & \cdots & xN(D) \end{vmatrix} \quad (7)$$

$$\theta = (\theta 2, \theta 1(1), \theta 1(2), \ldots, \theta 1(D))^T \quad (8)$$

The equation for estimating parameter θ in the equation (8) is given as $$\theta = (XX^T)^{-1} XY^T \quad (9)$$

However, it is known that if the correlation between two components of a sample vector is strong, the matrix $XX^T$ approaches singularity and the accuracy of the parameter vector that can be obtained in accordance with the equation (9) degrades.

As techniques for preventing the degradation, Principle Component Regression (PCR) and Partial Least Square methods are disclosed in W. Wu and R, Manne: "Fast regression method in a Lanczos (or PLS-1) basis. Theory and applications", Chemometrics and intelligent laboratory systems, 51, pp. 145-161 (2000) and R. Ergon: "Informative PLS score-loading plots for process understanding and monitoring", Journal of Process Control, 14, pp. 889-897 (2004). These techniques use analysis of the principle component, select a base of a partial space that maximizes the distribution of X, and perform regression analysis based on the base. In particular, an equation for estimating a parameter is represented as $$\theta = VS^{-1}U^T Y^T \quad (10)$$

where V, S, and U are matrixes that can be obtained by singular value decomposition of X.

$$X = USV^T \quad (11)$$

If the correlation between the components of a sample vector is weak, a regression parameter can be estimated by using the equation (9) given above. If there are components having a strong correlation with each other, a regression parameter can be estimated by using the equation (10).

However, values estimated by using the parameter estimating method based on the least square method do not have consistency. That is, it is known that there remains an error between a parameter estimated by using the equation (9) or (10) and the true value no matter how many samples are used.

On the other hand, the article by Amari and Kawanabe entitled "Estimation of linear relations: Is the least square method the best?" Industrial and Applied Mathematics, Vol. 6, No. 2, pp. 96-109 (June 1996) discloses a new method for estimating parameters in which an evaluation function for parameter estimation for single linear regression analysis modeled by an equation (12) given below is represented by an equation (13).

$$y = \theta 1 x \tag{12}$$

$$L = (Y - \theta 1^T X)(Y - \theta 1^T X)^T / (1 + \theta 1^2) \tag{13}$$

By applying a partial differential to the equation (13) with parameter $\theta 1$, the parameter estimation equation $$\theta 1 = \{-(Sxx - Syy) \pm ((Sxx - Syy)^2 + 4Sxy)^{1/2}\} / (2Sxy) \tag{14}$$

can be obtained.

The appropriate one of the two solutions to the quadratic equation (14), for example the one that has a smaller estimation error, may be selected as the estimated parameter value. Estimated values obtained by using this parameter estimation method have consistency.

However, the conventional technique has the following problems.

The parameter estimation method based on the evaluation function in the equation (13) disclosed in the article by Amari and Kawanabe given above is nothing more than a method that uses the single linear regression model represented by the equation (14) that does not include a shift term. The article does not consider a single linear regression model including a shift term or an evaluation function and a parameter estimation method for general multiple linear regression model.

SUMMARY OF THE INVENTION

An object of the present invention is to overcome the drawback of conventional techniques.

According to the present invention, there is provided a regression analysis method for obtaining an objective variable from multivariate data by performing multiple linear regression analysis to obtain regression coefficient, comprising the steps of:

obtaining a variance-covariance matrix having a combination of the multivariate data and the objective variable;

calculating a plurality of eigenvalues and corresponding eigenvectors by eigenvalue decomposition of the variance-covariance matrix;

calculating accumulated contributions from the plurality of eigenvalues in descending order of absolute value of the plurality of eigenvalues; and calculating regression coefficients from the eigenvalues and eigenvectors corresponding to any of the accumulated contributions that exceed a predetermined value.

According to the present invention, there is provided a regression analysis apparatus for obtaining an objective variable from multivariate data by performing multiple linear regression analysis to obtain a regression coefficients, comprising:

a unit configured to obtain a variance-covariance matrix having a combination of the multivariate data and the objective variable;

a vector calculation unit configured to calculate a plurality of eigenvalues and corresponding eigenvectors by eigenvalue decomposition of the variance-covariance matrix;

a accumulated contribution calculation unit configured to calculate accumulated contributions from the plurality of eigenvalues in descending order of absolute value of the plurality of eigenvalues; and a regression coefficient calculation unit configured to calculate regression coefficients from the eigenvalues and eigenvectors corresponding to any of the accumulated contributions that exceed a predetermined value.

Not all features of the present invention are given in the foregoing summary of the invention. Other features defined in the attached claims and combinations of any of the features fall within the scope of the present invention.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the descriptions, serve to explain the principles of the invention.

FIGS. 3A to 3H and FIGS. 4A to 4H depict views illustrating the results of estimation according to the present embodiment;

DESCRIPTION OF THE EMBODIMENTS

The preferred embodiments of the present invention will be described below in detail with reference to the accompanying drawings. The following embodiments do not limit the claims of the present invention, and not all combinations of features described in the embodiments are essential in solving the means of the present invention.

Figure 1:
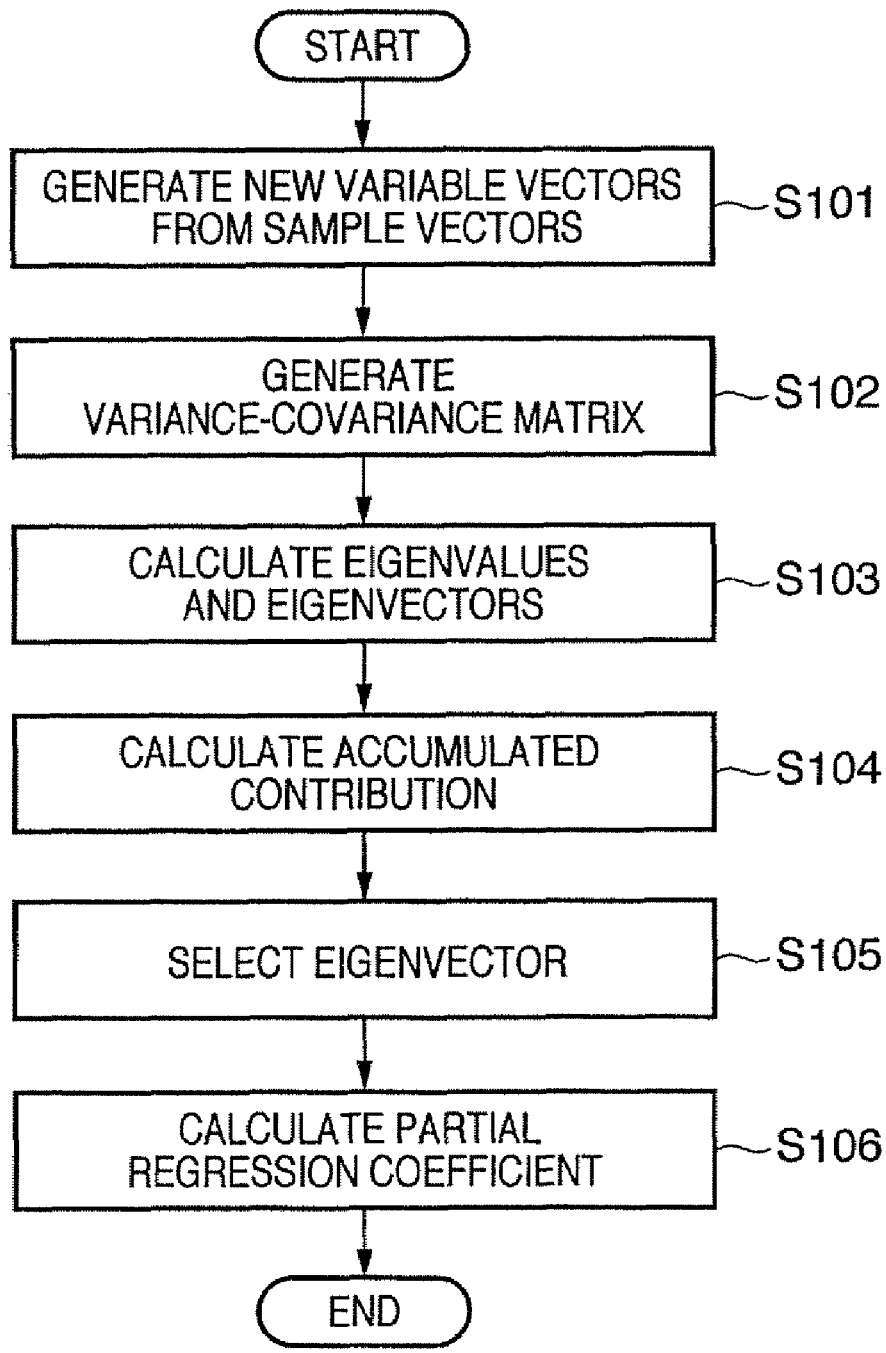
FIG. 1 is a flowchart illustrating a process performed by an information processing apparatus (computer) according to an embodiment of the present invention.

FIG. 1 is a flowchart illustrating a process performed by an information processing apparatus (computer) according to an embodiment of the present invention.

Figure 2:
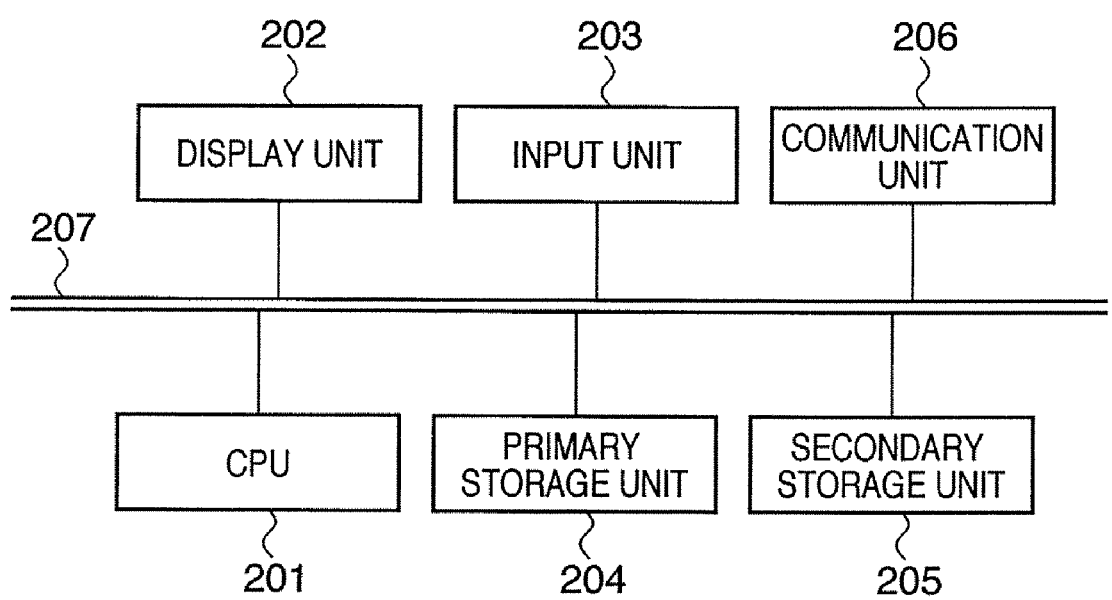
FIG. 2 is a block diagram showing a functional configuration of the information processing apparatus according to the present embodiment.

FIG. 2 is a block diagram showing a functional configuration of the information processing apparatus (computer) according to the present embodiment.

The configuration of the information processing apparatus (computer) will be described first with reference to FIG. 2.

A CPU 201 in FIG. 2 controls operation of the entire apparatus in accordance with a program stored in a primary storage unit 204. A display unit 202, which may be a liquidcrystal, plasma, or CRT display, displays data to be processed, the results of calculations, messages to a user, errors and the like. An input unit 203 includes a keyboard and a pointing device operated and used by a user for inputting data and commands into the apparatus. The primary storage unit 204 includes a memory such as a RAM. In a case that an application program is to be executed, the application program to be executed is loaded into the primary storage unit 204 from a secondary storage unit 205 and executed by the CPU 201. Also loaded in the primary storage unit 204 is an operating system (OS). The primary storage unit 204 also provides a work area for temporarily storing various kinds of data when the CPU 201 executes processing. The secondary storage unit 205 stores a preinstalled OS and application programs. Any of these programs are loaded from the secondary storage unit 205 into the primary storage unit 204 when the program is executed. The secondary storage unit 205 includes a hard disk and MO, for example. A communication unit 206 is connected to a LAN and the Internet and communicates data to and from the networks. A bus line 207 interconnects the components described above to transfer data and address and control signals.

A program that performs a process according to the present embodiment is stored in the secondary storage unit 205 beforehand and is loaded into the primary storage unit 204 in response to a command input through the input unit 203 or communication unit 206 and is executed under the control of the CPU 201.

In the present embodiment, regression analysis according to conventional techniques and regression analysis according to the present embodiment are performed on a set $\{(y_j, x_j)\}_j$ of sample vectors $x_j$ and samples $y_j$ obtained based on a preset linear coefficient parameter vector $\theta 1$ and sift parameter $\theta 2$. Estimated values obtained by the analyses are compared with each other.

The set of sample vectors $x_j$ is calculated as follows.

1. A uniform random number (rand) is multiplied by an appropriate positive real number C0 to obtain $\xi_j$.

$$\xi_j = C0 \cdot rand \quad (15)$$

2. Observation noise obtained based on a standard normal distribution is added to $\xi_j$ to obtain a sample vector $x_j$.

$$x_j = \xi_j + N(0, \epsilon^2) \quad (16)$$

3. A linear function $\zeta_j$ of $\xi_j$ is calculated.

$$\zeta_j = \theta 1^T \xi_j + \theta 2 \quad (17)$$

4. Sample $y_j$ can be obtained by adding the observation noise obtained based on the standard normal distribution to $\zeta_j$.

$$y_j = \zeta_j + N(0, \epsilon^2) \quad (18)$$

5. Steps 1 to 4 are repeated to obtain a set $\{(y_j, x_j)\}_j$ of sample vectors $x_j$ and samples $y_j$.

A process according to the present embodiment will be described below with reference to the flowchart of FIG. 1. A program that performs the process is stored in the primary storage unit 204 when executed, and is executed under the control of the CPU 201.

First, in step S101, new variable vectors $z_i$ are generated from sample vectors $x_i = (x_i(1), x_i(2), \ldots, x_i(d))^T$ and samples $y_i$ in accordance with an equation (19).

$$z_i = (y_i, x_i(1), x_i(2), \ldots, x_i(d))^T \quad (19)$$

In step S102, a matrix Z is obtained from the sample vectors $z_i$. The matrix Z can be obtained by arranging vectors $(z_i - \langle z \rangle)$ obtained by subtracting the average vector $\langle z \rangle$ of $z_i$ ($i = 1, \ldots, d+1$) from the sample vectors $z_i$ as $$Z = (z_1 - \langle z \rangle, z_2 - \langle z \rangle, \ldots z_{d+1} - \langle z \rangle) \quad (20)$$

A variance-covariance matrix R is generated from the matrix in accordance with an equation (21).

$$R = ZZ^T \quad (21)$$

In step S103, the eigenvalues $\lambda_i$ of the variance-covariance matrix R and the corresponding eigenvectors $q_i$ ($i = 1, \ldots, d+1$) are calculated.

It is assumed here that the eigenvalues $\lambda_i$ and the corresponding eigenvectors $q_i$ are arranged in descending order of absolute value of the eigenvalues $\lambda_i$.

In step S104, an accumulated contribution $\eta_k$ corresponding to each eigenvalue $\lambda_i$ is calculated as $$\eta_k = \left( \sum_{j=1}^{j=k} \lambda_j \right) \Big/ \left( \sum_{j=1}^{j=d+1} \lambda_j \right) \quad (22)$$

In step S105, an accumulated contribution (which is denoted by $\eta_j$) that exceeds a predetermined effective accumulated contribution $\eta_C$ is searched for and the eigenvector $q_{j+1}$ corresponding to the eigenvalue $\lambda_{j+1}$ that yielded $\eta_j$ is stored in $\zeta 1(j)$.

At step S106, parameter $\theta 1$ is estimated as $$\theta 1 = (\zeta 1(2)/\zeta 1(1), \zeta 1(3)/\zeta 1(1), \ldots, \zeta 1(d+1)/\zeta 1(1))^T \quad (23)$$

Parameter $\theta 2$ is estimated as $$\theta 2 = \langle y \rangle - \theta 1^T \langle x \rangle \quad (24)$$

where $\langle y \rangle$ is the average of the samples y.

Figure 6:
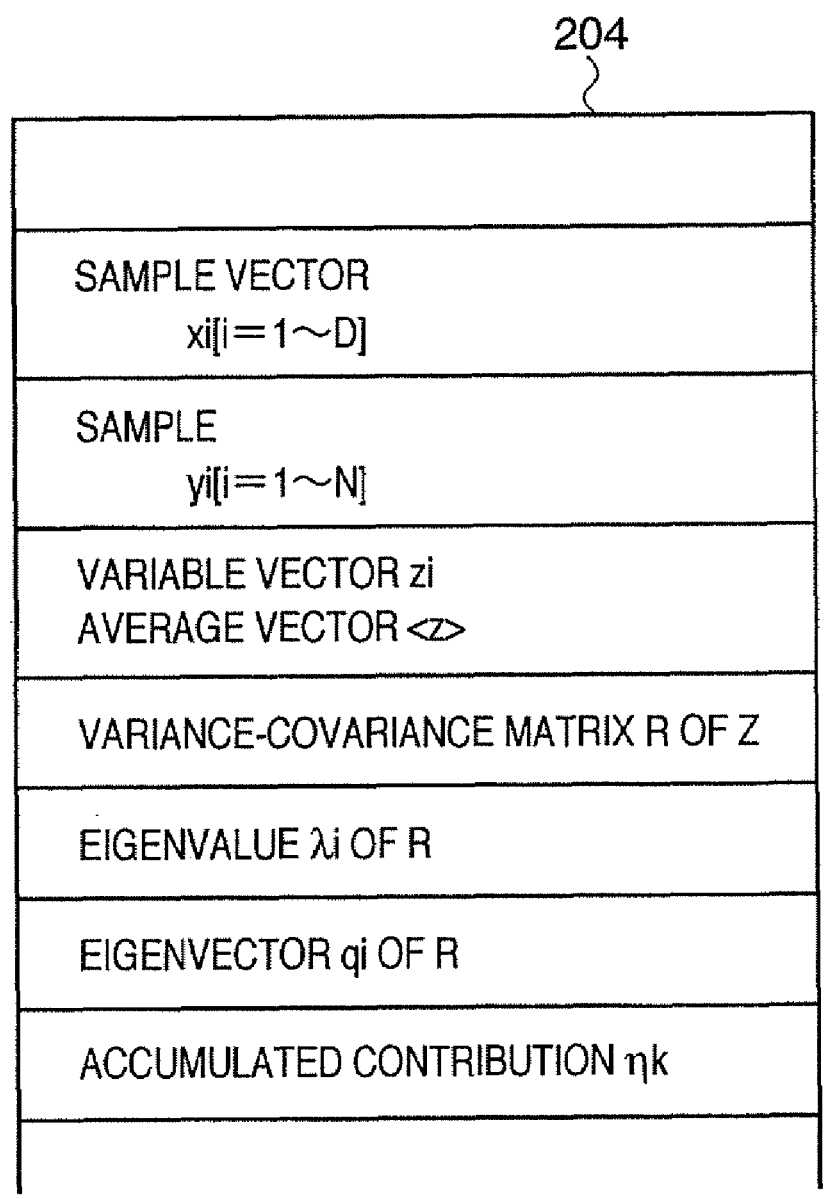
FIG. 6 depicts a view illustrating data such as samples, variables, and calculation results stored in a primary storage unit for use in computation in the embodiment.

FIG. 6 depicts a view illustrating a states in which the above-described sample vectors $x_i$, samples $y_i$, variable vectors $z_i$, their average $\langle z \rangle$, variance-covariance matrix R and its eigenvalues $\lambda_i$, eigenvectors $q_i$, and accumulated contribution $\eta_k$ are stored in the primary storage unit 204.

FIGS. 3A to 3H and FIGS. 4A to 4H illustrate the results of estimation based on the present embodiment. The abscissa in the figures represents the number of samples and ordinate represents the norm of the error between a value estimated by using each method and the true value.

Curves 301 and 401 in FIGS. 3D and 4D represent the results of estimation by the least square method and alternate long and short dashed curves 302 and 402 represent results of estimation by the PCR method. Solid curves 303 and 403 represent the results of estimation by the PLS method. Dashed curves 304 and 404 represent the results of estimation according to the present embodiment. While reference numerals 301 to 304 and 401 to 404 are omitted in FIGS. 3A to 3C, 3E to 3H and 4A to 4C, and 4E to 4H for simplicity, the like curves in these figures have like meanings.

FIGS. 3A to 3H show the results obtained in a case that the sample vectors are 5 dimensional, and FIGS. 4A to 4H show the results obtained in a case that sample vectors are 10-dimensional. FIGS. 3A, 4A, 3B, 4B, 3C, 4C, 3D and 4D indicate the results in a case that the variance-covariance matrices R of variable vectors are regular. FIGS. 3E, 4E, 3F, 4F, 3G, 4G, 3H, and 4H show the results in a case that the variance-covariance matrices R are close to singularity. FIGS. 3A and 4A show the results for shift parameter $\theta 2$ and FIGS. 3B and 4B indicate the results for linear coefficient parameter vector $\theta 1$.

It can be seen from FIGS. 3A and 3C and 4A and 4C that all methods provide the estimated values for shift parameter $\theta 2$ with equivalent degrees of accuracy when the variance-covariance matrix R is regular.

It can be seen from FIGS. 3B and 3D and FIGS. 4B and 4D that when the variance-covariance matrix R is regular, the method of the present embodiment indicated by the dashed curves (304 and 404) can provide the estimated values for linear coefficient parameter vector θ1 with the highest accuracy, the PLS method indicted by solid curves (303 and 403) with the second, and the least square method (301 and 401) with the third, and the PCR method (302 and 402) with the lowest.

On the other hand, it can be seen from FIGS. 3E and 3G and FIGS. 4E and 4G that all methods can provide the estimated values for shift parameter θ2 with equivalent degrees of accuracy when the variance-covariance matrix R is close to singularity.

Furthermore, it can be seen from FIGS. 3F and 3H and FIGS. 4F and 4H that in a case that the variance-covariance matrix R is close to singularity, the method according to the present embodiment provides the estimated values for linear coefficient parameter vector θ1 with the highest degree of accuracy, the PLS method the second, the least square method the third, and the PCR method the lowest.

It also can be seen that errors in the estimated values for linear coefficient parameter vector (303 and 404) by the method according to the present embodiment alone decreases as the number of samples increases (toward the right of the graph).

Regression analysis of the weights and heights of subjects that is dealt with in the article by L J. Peterson, R W. Johnson, C J. Kerk entitled "Exploring Relationship in Body Dimensions", Journal of Statistics Education, Vol. 11, No. 2 (2003) was performed.

Body dimensions and weights of 247 males and 260 females are contained in a data file.

Figure 5:
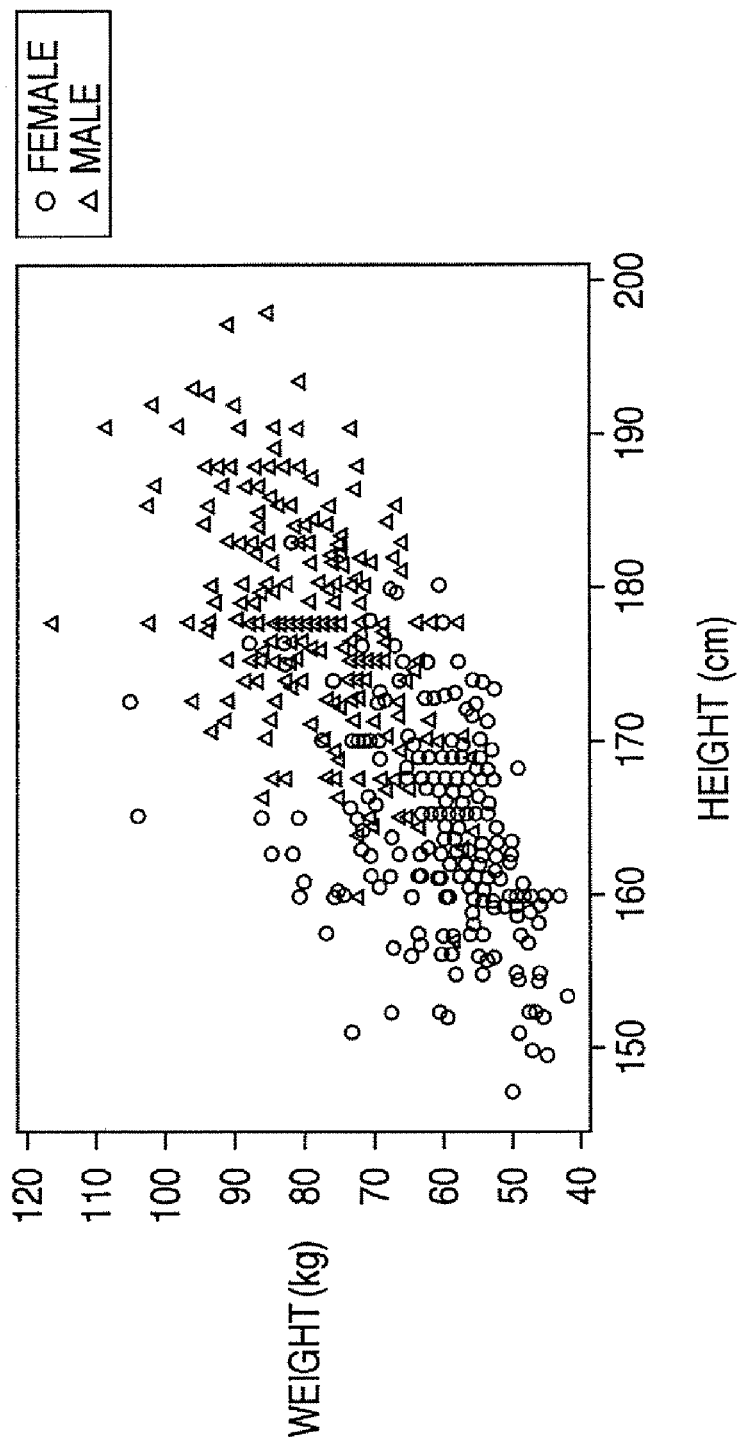
FIG. 5 depicts a view illustrating an example of distributions of the heights and weights of males and females obtained according to the present embodiment.

FIG. 5 shows an exemplary distribution of heights and weights of the males and females. The abscissa in FIG. 5 represents height and the ordinate represents weight. The circles represent data on the males and triangles represent data on the females.

Liner regression analysis was performed by using the data on the heights and the weights of the 247 males to estimate parameters for representing the height as the linear function of the weight.

$$\text{height}=(\text{parameter } 1(\theta 1))\times\text{weight}+(\text{parameter } 2(\theta 2)) \qquad (25)$$

Then the equation (25) was used to estimate the heights of the females from their weights and the average of the absolute values of errors from the correct values was calculated. Table 1 shows estimated parameter values and the averages of absolute values of errors obtained by using conventional methods and the method according to the present embodiment. Here, the heights are related to the weights in accordance with the equation (25).

TABLE 1

| METHOD | ESTIMATED PARAMETER 1 | ESTIMATED PARAMETER 2 | AVERAGE OF ABSOLUTE VALUES OF ERRORS |
|---|---|---|---|
| LEAST SQUARE METHOD | 0.3812 | 147,8872 | 0.5342 |
| PCR | 0.3812 | 147,8872 | 0.5342 |
| PLS | 0.3812 | 147,8872 | 0.5342 |
| EMBODIMENT | 0.5176 | 137,2703 | 0.4588 |

Referring to Table 1, the three conventional methods provided equal values of estimated parameters 1 and 2. Accordingly, the averages of absolute values of the errors are also identical.

On the other hand, the estimated values of parameters 1 and 2 obtained by using the method according to the present embodiment differ from those obtained by the conventional methods. It can be seen that the average of absolute values of the errors is smaller than those in the three conventional methods.

Thus, the method according to the present embodiment can improve the accuracy of estimation in linear regression analysis.

As has been described, the present embodiment improves the accuracy of estimation not only when the variance-covariance matrix R of variable vectors is regular but also when it is close to singularity.

Furthermore, the present embodiment can provide estimated values that approach the true values as the number of samples increases.

Other Embodiment

The embodiment of the present invention has been described in detail. The present invention can be applied to a system consisting of multiple devices or to an apparatus consisting of a single device.

It should be noted that the present invention can be embodied as an implementation in which a software program that implements the functions of the embodiment described above is provided to a system or apparatus directly or remotely and the program is read and executed by a computer of the system or apparatus. The implementation does not need to be a program. Any implementation that has the capability of a program is possible.

Therefore, the program code installed in a computer in order to implement the functions and processing of the present invention on the computer also implements the present invention. In other words, the claims of the present invention also include a computer program for implementing the functions and processing of the present invention. The computer program may be a program in any form that has the capability of a program, such as an object code, a program executed by an interpreter, and script data to be provided to an operating system.

The program can be provided on any of various recording media, such as a floppy (®) disk, hard disk, optical disc, magneto-optical disk (MO), CD-ROM, CD-R, CD-RW, magnetic tape, non-volatile memory card, ROM, and DVD (DVD-ROM and DVD-R).

The program can also be provided to a client computer by connecting to a Web page on the Internet through a browser of the client computer and downloading the computer program from the Web page to a recording medium such as a hard disk. The program downloaded may be a computer program of the present invention or may be a compressed file including an automatic install function. Furthermore, the program code constituting the program of the present invention may be divided into files and the files may be downloaded from different Web pages. In other words, the claims of present invention also include a WWW server from which a number of users can download the program file that implements the functions and processing of the present invention on computers.

The computer program of the present invention may be delivered to users in encrypted form on a storage medium such as a CD-ROM. In that case, users who meet predetermined requirements are allowed to download key information for decrypting the program from a Web page through the Internet and the users use the key information to install the encrypted program in an executable format in a computer.

The present invention can also be implemented in a mode other than the above-described modes in which a computer reads and executes the program to implement functions of any of the embodiments described above. For example, an operating system running on a computer may perform part or all of actual processing according to instructions in the program to implement functions of any of the embodiments described above.

Furthermore, the program read from a recording medium may be written in a memory in an extension board inserted into a computer or an extension unit attached to a computer. Then, a CPU in the extension board or extension unit performs part or all of actual processing according to instructions in the program to implement functions of any of the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This Application Claims Priority from Japanese Patent Application No. 2006-161636, filed Jun. 9, 2006, which is hereby incorporated by reference herein its entirety.

What is claimed is:

1. A regression analysis method for obtaining an objective variable from multivariate data by performing, with a computer program stored in a computer readable medium, for controlling a computer, multiple linear regression analysis to obtain regression coefficient, comprising:
   a first input step of inputting a combination of the objective variable and the multivariate data;
   an obtaining step of obtaining a variance-covariance matrix having the combination of the multivariate data and the objective variable;
   a vector calculation step of calculating a plurality of eigenvalues and corresponding eigenvectors by eigenvalue decomposition of the variance-covariance matrix;
   an accumulated contributions calculation step of calculating accumulated contributions from the plurality of eigenvalues in descending order of absolute value of the plurality of eigenvalues;
   a regression coefficients calculation step of calculating regression coefficients from the eigenvalues and eigenvectors corresponding to the accumulated contributions that exceed a predetermined value;
   a second input step of inputting multivariate data that is not used in said regression coefficients calculation step;
   a calculation step of calculating, by the computer, the objective variable with respect to the multivariate data input in said second input step by using the regression coefficients calculated in said regression coefficients calculation step; and
   an output step of outputting the objective variable calculated in said calculation step.

2. The regression analysis method according to claim 1, wherein ordinal numbers j are assigned to the eigenvalues and eigenvectors corresponding to the accumulated contributions that exceed the predetermined value in descending order of absolute value of the eigenvalues and the (j+1)-th eigenvector is $\zeta 1(j+1)$, the regression coefficients ($\theta 1$ and $\theta 2$) are calculated in said regression coefficients calculation step by using equations (A) and (B)

$$\theta 1 = (\zeta 1(2)/\zeta 1(1), \zeta 1(3)/\zeta 1(1), \ldots, \zeta 1(d+1)/\zeta 1(1))^T \quad (A)$$

and $$\theta 2 = <y> - \theta 1^T <x> \quad (B)$$

where $<x>$ is the average of samples of x and $<y>$ is the average of samples of y.

3. The regression analysis method according to claim 2, further comprising a step of comparing the $\zeta 1(1)$ with a preset positive real number and, if the $\zeta 1(1)$ is smaller than the positive real number, determining that the regression coefficient cannot be calculated.

4. The regression analysis method according to claim 1, wherein the regression coefficients have a relation with a set x={x1, x2, ..., xN} of d-dimensional variable vectors xj=$(xj(1), xj(2), \ldots, xj(d))^T$ and a set Y={y1, y2, ..., yN} of one-dimensional variables yj such that $y = \theta 1^T x + \theta 2$.

5. The regression analysis method according to claim 1, wherein said accumulated contributions calculation step calculates the accumulated contributions from the eigenvalues {λ1, λ2, ..., λ(d+1)} and the eigenvectors {q1, q2, ... qd+1} by using the following equation (C)

$$\eta k = \left(\sum_{j=1}^{j=k} \lambda j\right) / \left(\sum_{j=1}^{j=d+1} \lambda j\right) \quad (C)$$

wherein ηk is an accumulated contribution corresponding to each eigenvalue λj.

6. The regression analysis method according to claim 5, wherein said regression coefficients calculation step obtains k that causes the accumulated contribution to exceed the predetermined value and substitutes the k for $\zeta 1(j)$ in the equations (A) and (B) to calculate the regression coefficients.

7. A computer program stored in a computer readable medium, for controlling a computer to determine a regression coefficient by multiple linear regression analysis for obtaining an objective variable from multivariate data, the program comprising code for implementing the following steps:
   a first input step of inputting a combination of the objective variable and the multivariate data;
   an obtaining step of obtaining a variance-covariance matrix having a combination of the multivariate data and the objective variable;
   a vector calculation step of calculating a plurality of eigenvalues and corresponding eigenvectors by eigenvalue decomposition of the variance-covariance matrix;
   an accumulated contributions calculation step of calculating accumulated contributions from the plurality of eigenvalues in descending order of absolute value of the plurality of eigenvalues;
   a regression coefficients calculation step of calculating regression coefficients from the eigenvalues and eigenvectors corresponding to the accumulated contributions that exceed a predetermined value;
   a second input step of inputting multivariate data that is not used in said regression coefficients calculation step;
   a calculation step of calculating the objective variable with respect to the multivariate data input in said second input step by using the regression coefficients calculated in said regression coefficients calculation step; and an output step of outputting the objective variable calculated in said calculation step.

8. A regression analysis method for obtaining a height of a person as an objective variable from multivariate data including weights of a plurality of persons by performing, with a computer program stored in a computer readable medium, for controlling a computer, multiple linear regression analysis to obtain a regression coefficient, comprising:

a first input step of inputting a combination of the objective variable and the multivariate data;

an obtaining step of obtaining a variance-covariance matrix having the combination of the multivariate data and the objective variable;

a vector calculation step of calculating a plurality of eigenvalues and corresponding eigenvectors by eigenvalue decomposition of the variance-covariance matrix;

an accumulated contributions calculation step of calculating accumulated contributions from the plurality of eigenvalues in descending order of absolute value of the plurality of eigenvalues;

a regression coefficients calculation step of calculating regression coefficients from the eigenvalues and eigenvectors corresponding to the accumulated contributions that exceed a predetermined value;

a second input step of inputting a weight of a person;

a calculation step of calculating, by the computer, a height of the person whose weight was inputted in the second input step by using the regression coefficients calculated in said regression coefficients calculation step; and an output step of outputting the height calculated in said calculation step.

* * * * *